United States Patent [19]
Phillion et al.

[11] Patent Number: 5,639,112
[45] Date of Patent: Jun. 17, 1997

[54] AIR BAG MODULE

[75] Inventors: Jack A. Phillion, Shelby Township; Angelo J. Adler, Armada; Ali S. Emambakhsh, Flat Rock; Gary G. Gordon, Southfield; David J. Davis, Troy, all of Mich.

[73] Assignees: TRW Vehicle Safety Systems Inc.; TRW Inc., both of Lyndhurst, Ohio; Larry J. Winget, Leonard, Mich.

[21] Appl. No.: 597,118

[22] Filed: Feb. 6, 1996

[51] Int. Cl.⁶ ........................................... B60R 21/16
[52] U.S. Cl. ........................... 280/728.2; 280/732
[58] Field of Search ........................... 280/728.2, 731, 280/732, 743.1

[56] References Cited

U.S. PATENT DOCUMENTS

| | | | |
|---|---|---|---|
| 4,941,678 | 7/1990 | Lauritzen et al. | 280/732 |
| 5,058,919 | 10/1991 | Paquette et al. | 280/732 |
| 5,064,218 | 11/1991 | Hartmeyer | 280/743.1 |
| 5,149,130 | 9/1992 | Wooley et al. | 280/743.1 |
| 5,176,400 | 1/1993 | McGuire et al. | 280/728.2 |
| 5,257,815 | 11/1993 | Bachelder et al. | 280/728.2 |
| 5,295,706 | 3/1994 | Morita | 280/728.2 |
| 5,333,897 | 8/1994 | Landis et al. | 280/728.2 |
| 5,348,344 | 9/1994 | Blumenthal et al. | 280/737 |
| 5,350,190 | 9/1994 | Szigethy | 280/728.2 |
| 5,354,093 | 10/1994 | Schenck et al. | 280/728.2 |
| 5,356,174 | 10/1994 | Rhein et al. | 280/728.2 |
| 5,409,256 | 4/1995 | Gordon et al. | 280/728.2 |
| 5,433,472 | 7/1995 | Green et al. | 280/728.2 |

FOREIGN PATENT DOCUMENTS

2246984 2/1992 United Kingdom.

*Primary Examiner*—Kenneth R. Rice
*Attorney, Agent, or Firm*—Tarolli, Sundheim, Covell, Tummino & Szabo

[57] ABSTRACT

An air bag module (12) includes an inflator (20), a canister (24) which contains the inflator (20), and an air bag (18). The air bag module (12) further includes a retainer assembly (26) which contains the air bag (18) in an uninflated condition. The retainer assembly (26) includes a pair of retainers (210,212) that are fastened together with an edge portion (192) of the air bag (18) retained between the retainers (210,212). The retainer assembly (26) and the canister (24) are fastened to each other in an assembled relationship in which an inlet opening (196) in the air bag (18) is aligned with an outlet opening (112) in the canister (24). The retainer assembly (26) and the canister (24) snap together into a mechanically interlocked condition when they are moved into their assembled relationship. The inflator (20) and the canister (24) also snap together into a mechanically interlocked condition when the inflator (20) is moved into the canister (24).

35 Claims, 9 Drawing Sheets

AIR BAG MODULE

FIELD OF THE INVENTION

The present invention relates to an air bag for restraining an occupant of a vehicle, and particularly relates to an air bag module including an air bag and an inflator for inflating the air bag.

BACKGROUND OF THE INVENTION

An inflatable vehicle occupant restraint, such as an air bag, is inflated to protect an occupant of a vehicle upon the occurrence of a vehicle collision. When the vehicle experiences a collision-indicating condition of at least a predetermined threshold level, an inflator is actuated. The inflator then emits inflation fluid which is directed to flow into the air bag. The inflation fluid inflates the air bag from an uninflated condition to an inflated condition in which the air bag extends into the vehicle occupant compartment. When the air bag is inflated into the vehicle occupant compartment, it restrains an occupant of the vehicle from forcefully striking parts of the vehicle as a result of the collision.

An air bag and an inflator are typically assembled together as parts of an air bag module. In addition to the air bag and the inflator, the module includes a reaction canister. The reaction canister contains the air bag and the inflator, and has mounting tabs or other suitable parts for mounting of the module in the vehicle. The reaction canister further has a deployment opening through which the air bag emerges from the reaction canister when the air bag is being inflated.

The air bag has an inlet opening for receiving inflation fluid from the inflator. A retainer ring extends around the inlet opening. The retainer ring is fastened to the air bag, and is fastened to the reaction canister to anchor the air bag in the reaction canister. A deployment door extends over the deployment opening in the reaction canister to conceal the air bag and the other parts of the module from the vehicle occupant compartment.

When the inflator is actuated, the reaction canister directs the inflation fluid to flow from the inflator to the inlet opening in the air bag. As the inflation fluid enters the air bag, it begins to move the air bag outward through the deployment opening in the reaction canister. The inflation fluid then moves the air bag forcefully against the deployment door. The deployment door is ruptured by the force of the fluid pressure in the air bag, and is moved out of the path of the air bag as the inflation fluid continues to inflate the air bag outward from the reaction canister through the deployment opening and into the vehicle occupant compartment.

SUMMARY OF THE INVENTION

In accordance with the present invention, an apparatus for restraining a vehicle occupant comprises a canister, an inflator having an installed position in the canister, and an inflatable vehicle occupant restraint. The canister has an outlet opening. The restraint has an edge portion defining an inlet opening.

The apparatus further comprises a retainer assembly, first fastener means, and second fastener means. The retainer assembly comprises means for containing the restraint in an uninflated condition, and includes a pair of retainers. The first fastener means fastens the retainers to each other, with the edge portion of the restraint being retained between the retainers.

The second fastener means fastens the retainer assembly and the canister to each other in an assembled relationship. When the retainer assembly and the canister are thus fastened to each other, the inlet opening in the restraint is aligned with the outlet opening in the canister. The second fastener means snaps into a locked condition to establish a mechanical interlock between the retainer assembly and the canister when the retainer assembly and the canister are moved into their assembled relationship.

In a preferred embodiment of the present invention, the canister comprises third fastener means. The third fastener means snaps into a locked condition to establish a mechanical interlock between the inflator and the canister when the inflator is moved to its installed position in the canister. In the preferred embodiment, the retainer assembly and the canister together comprise means for moving the inflator from an initial position to its installed position upon movement of the retainer assembly and the canister into their assembled relationship. In accordance with this feature of the present invention, the retainer assembly includes an abutment member which abuts an end wall of the inflator between the end wall of the inflator and an adjacent end wall of the canister. The abutment member pushes the inflator longitudinally from the initial position toward the installed position, and helps to hold the inflator in the installed position.

The preferred embodiment of the present invention further includes mounting means for supporting the canister in a vehicle. The mounting means is flexible so as to yield in a predetermined amount under a force transmitted from the restraint to the canister upon movement of a vehicle occupant forcefully against the restraint.

Further in accordance with the present invention, the retainers are preferably formed of a plastic material, with the first fastener means comprising portions of the retainers which are fused together. Those portions of the retainers are preferably heat-staked to each other, but may alternatively be ultrasonically welded to each other. The retainers may also include opposed clamping structures, such as meshing rows of teeth, which clamp the edge portion of the restraint between the retainers.

BRIEF DESCRIPTION OF THE DRAWINGS

The present invention will become apparent to those skilled in the art to which the present invention relates from reading the following description with reference to the accompanying drawings, in which.

DESCRIPTION OF PREFERRED EMBODIMENTS

Figure 1:
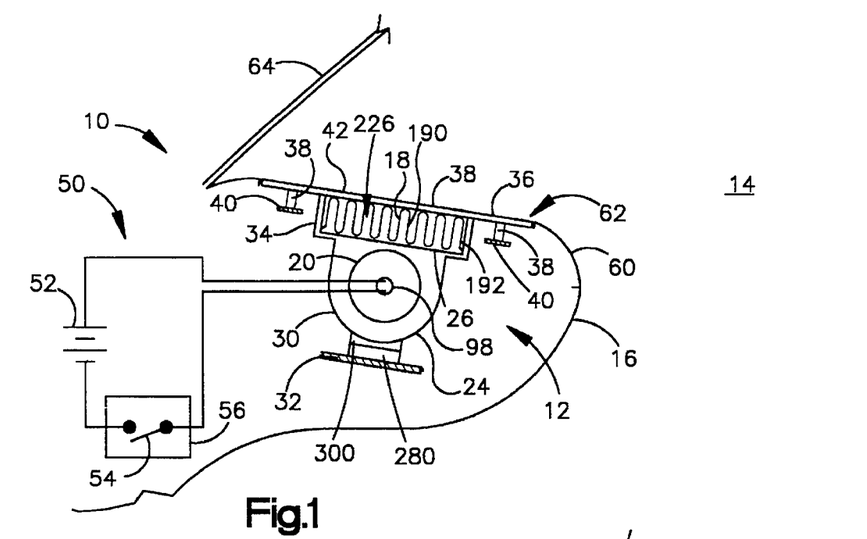
FIG. 1 is a schematic view of a vehicle occupant restraint apparatus comprising a first embodiment of the present invention.
Figure 2:
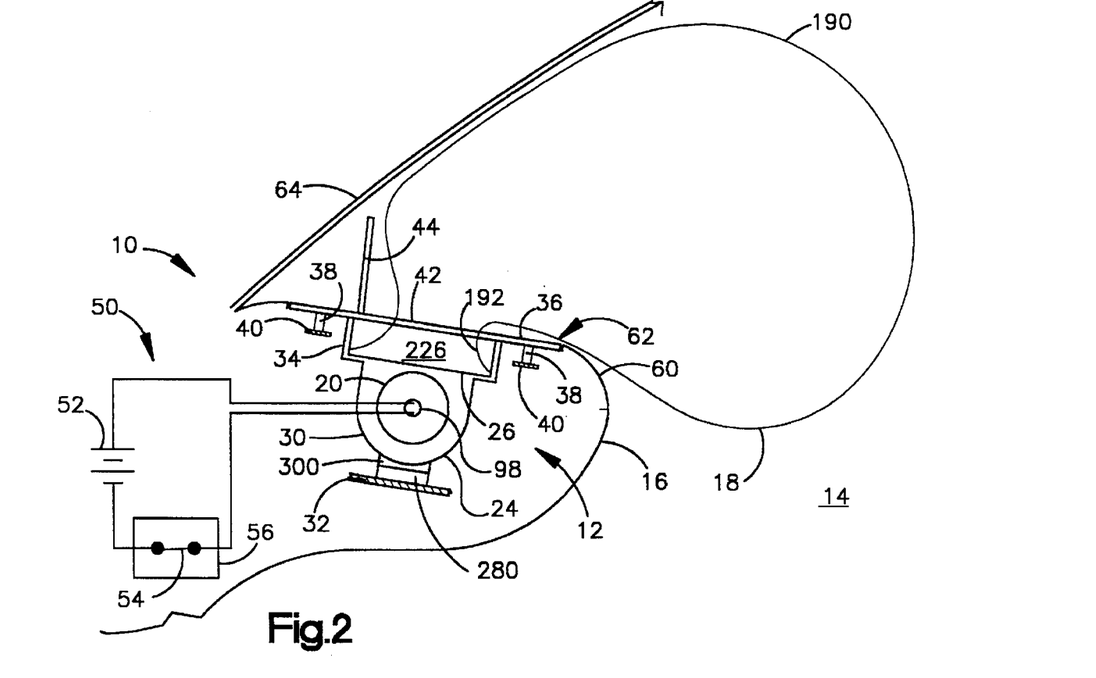
FIG. 2 is a schematic view showing the apparatus of FIG. 1 in an actuated condition.

As shown schematically in FIGS. 1 and 2, a vehicle occupant restraint apparatus 10 comprising a first embodiment of the present invention includes an air bag module 12. The air bag module 12 is mounted in a vehicle at a location adjacent to the vehicle occupant compartment 14, such as in the instrument panel 16 at the passenger side of the vehicle. The air bag module 12 includes a particular type of inflatable vehicle occupant restraint 18 which is commonly referred to as an air bag. The air bag module 12 also includes an inflator 20 for inflating the air bag 18.

The inflator 20 comprises a source of inflation fluid which inflates the air bag 18 from a folded, uninflated condition, as shown in FIG. 1, to an unfolded, inflated condition, as shown in FIG. 2. When the air bag 18 is being inflated, it moves into the vehicle occupant compartment 14 between the instrument panel 16 and an occupant of the vehicle. The air bag 18 then restrains movement of the occupant toward the instrument panel 16 to help protect the occupant from a forceful impact with the instrument panel 16 or other parts of the vehicle.

The air bag module 12 further includes a reaction canister 24 and a retainer assembly 26. An inner portion 30 of the reaction canister 24 contains the inflator 20, and is mounted on a supporting part 32 of the instrument panel 16. An outer portion 34 of the reaction canister 24 contains the retainer assembly 26. The retainer assembly 26, in turn, contains the air bag 18 in the folded, uninflated condition, and is fastened to the reaction canister 24 so as to anchor the air bag 18 to the reaction canister 24.

A deployment assembly 36 covers the air bag 18, the retainer assembly 26, and the reaction canister 24. The deployment assembly 36 includes a plurality of mounting bosses 38 which are fastened to a corresponding plurality of mounting portions 40 of the instrument panel 16. The deployment assembly 36 further includes a deployment panel 42 with a deployment door 44 (FIG. 2). The deployment door 44 is pivotal outward from the deployment panel 42 to an opened position, as shown in FIG. 2, upon inflation of the air bag 18. Preferably, the foregoing parts of the deployment assembly 36 are formed of a plastic material, and are constructed as disclosed in copending U.S. patent application Ser. No. 08/462,805, filed Jun. 5, 1995, entitled DEPLOYMENT DOOR ASSEMBLY, and assigned to TRW Vehicle Safety Systems Inc.

The inflator 20 is included in an electrical circuit 50. The electrical circuit 50 also includes a power source 52, which is preferable the vehicle battery and/or a capacitor, and a normally open switch 54. The switch 54 is part of a sensor 56 which senses a condition indicating the occurrence of a vehicle collision. The collision-indicating condition may comprise, for example, sudden vehicle deceleration caused by a collision. If the collision-indicating condition is above a predetermined threshold, it indicates the occurrence of a collision for which inflation of the air bag 18 is desired to protect an occupant of the vehicle. The sensor 56 then closes the switch 54, and the inflator 20 is actuated electrically.

When the inflator 20 is actuated, it emits a large volume of inflation fluid into the inner portion 30 of the reaction canister 24. The inner portion 30 of the reaction canister 24 directs the inflation fluid to flow outward to the air bag 18 in the outer portion 34 of the reaction canister 24. As the inflation fluid enters the air bag 18, it moves the air bag 18 forcefully outward against the deployment door 44 on the deployment panel 42. The air bag 18 then pivots the deployment door 44 outward to the opened position of FIG. 2. As the inflation fluid continues to inflate the air bag 18, it moves the air bag 18 outward into the vehicle occupant compartment 14 past the deployment door 44.

As shown by way of example in FIGS. 1 and 2, the air bag module 12 is mounted in the instrument panel 16 in an arrangement known as a top mount. The air bag 18 is thus inflated outward from an upper portion 60 of the instrument panel 16 which is known as a topper pad. The deployment panel 42 extends fully across an opening 62 in the topper pad 60 to continue the contour and the trim theme of the topper pad 60 across the opening 62. In this arrangement, the deployment door 44 faces partially toward the vehicle windshield 64, and the air bag 18 is inflated into contact with the windshield 64. Tethers or the like (not shown) can be used to control interaction of the air bag 18 with the windshield 64 in any suitable manner known in the art.

The inflator 20 may contain an ignitable gas generating material which, when ignited, rapidly generates a large volume of gas. The inflator 20 may alternatively contain a stored quantity of pressurized inflation fluid, or a combination of pressurized inflation fluid and ignitable material for heating the inflation fluid. In the preferred embodiment of the present invention shown in the drawings, the inflator 20 contains pressurized inflation fluid which comprises a combustible mixture of gases. The combustible mixture of gases preferably has a composition set forth in U.S. Pat. No. 5,348,344 to Blumenthal et al., entitled APPARATUS FOR INFLATING A VEHICLE OCCUPANT RESTRAINT USING A MIXTURE OF GASES, and assigned to TRW Vehicle Safety Systems Inc.

Figure 3:
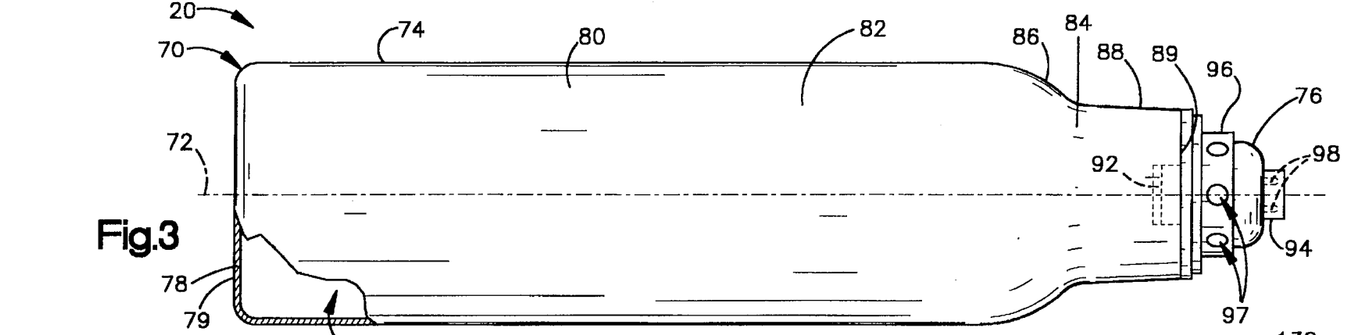
FIG. 3 is a view of a part of the apparatus of FIG. 1.

As shown in greater detail in FIG. 3, the inflator 20 comprises a cylindrical pressure vessel 70 with a longitudinal central axis 72. The pressure vessel 70 includes an elongated container 74, and further includes an actuator assembly 76 at one end of the container 74. A circular end wall 78 of the container 74 extends diametrically across the axis 72, and defines a first, closed end 79 of the container 74.

An elongated body wall 80 of the container 74 has a major portion 82 and a neck portion 84. The major portion 82 of the body wall 80 extends axially from the end wall 78 to the neck portion 84. The neck portion 84 of the body wall 80 has a tapered section 86 and a cylindrical section 88 with a reduced diameter. The cylindrical section 88 extends axially from the tapered section 86, and defines a second, open end 89 of the container 74.

The actuator assembly 76 extends diametrically across the open end 89 of the container 74 to close the open end 89. In this configuration, the actuator assembly 76 and the end wall 78 define opposite ends of an elongated storage chamber 90 within the container 74. The storage chamber 90 contains the pressurized inflation fluid described above.

As shown schematically in FIG. 3, the actuator assembly 76 includes a rupturable closure wall 92 which faces inward of the storage chamber 90. The actuator assembly 76 further includes a pyrotechnic squib 94 and a manifold 96 with a plurality of fluid outlet openings 97. The squib 94 is a known device with a pair of electrodes 98 for connection of the squib 94 in the electrical circuit 50 (FIG. 1). When the switch 54 in the circuit 50 is closed upon the occurrence of a vehicle collision, as described above, electric current is directed through the squib 94 between the electrodes 98. A pyrotechnic material (not shown) in the squib 94 then produces and emits combustion products which cause the closure wall 92 to be ruptured. Additionally, the combustible mixture of gases in the storage chamber 90 is ignited by the combustion products emitted from the squib 94. The resulting combustion in the storage chamber 90 causes the temperature and pressure of the inflation fluid to increase to elevated levels so that the inflation fluid emerges from the outlet openings 97 at a high flow rate for rapid inflation of the air bag 18.

The reaction canister 24 is preferably formed of a plastic material, such as a glass-reinforced thermoplastic material. As described briefly above with reference to FIG. 1, the inner portion 30 of the reaction canister 24 contains the inflator 20, and the outer portion 34 of the reaction canister 24 contains the retainer assembly 26. As shown in greater detail in FIGS. 4–6, the inner portion 30 of the reaction canister 24 defines an inner compartment 100 for containing the inflator 20.

The inner compartment 100 is an elongated, generally trough-shaped space. A first end wall 102 of the reaction canister 24 defines a closed end of the inner compartment 100. A second end wall 104 of the reaction canister 24 is located opposite the first end wall 102, and has an annular inner edge surface 106 defining a circular opening 108 centered on an axis 109. The second end wall 104 thus defines an open end of the inner compartment 100. A major wall 110 of the reaction canister 24 extends fully along the length of the inner portion 30 between the opposite end walls 102 and 104. The major wall 110 has a somewhat U-shaped cross sectional configuration (FIG. 6) extending around three sides of the inner compartment 100. A fourth, open side 112 of the inner compartment 100 has a rectangular peripheral shape defined by an inner edge surface 114 of the reaction canister 24. The open side 112 of the inner compartment 100 comprises an outlet opening through which inflation fluid can exit the inner compartment 100.

The inner portion 30 of the reaction canister 24 further has a plurality of parts which support the inflator 20 in an installed position in the inner compartment 100. These include a pair of neck tabs 120, a pair of end wall tabs 122, and four body wall tabs 124. The neck tabs 120 are located near the second end wall 104, and project inward from the major wall 110 at locations that are opposed to each other across the inner compartment 100. The end wall tabs 122 project inward from the first end wall 102 on respective opposite sides of the axis 109. Two of the body wall tabs 124 project inward from the major wall 110 on one side of the inner compartment 100. The other two body wall tabs 124 project inward from the major wall 110 on the other side of the inner compartment 100 at locations opposed to the first two body wall tabs 124.

Figure 4:
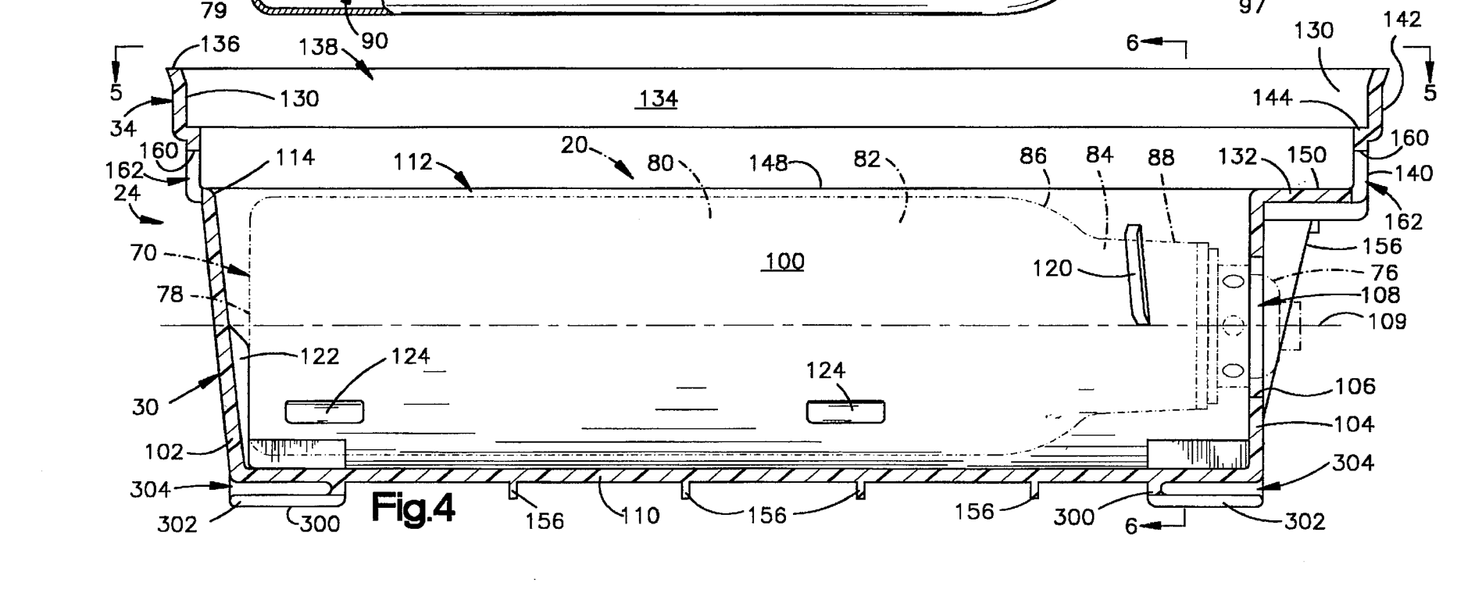
FIG. 4 is a view showing the part of FIG. 3 with another part of the apparatus of FIG. 1.
Figure 5:
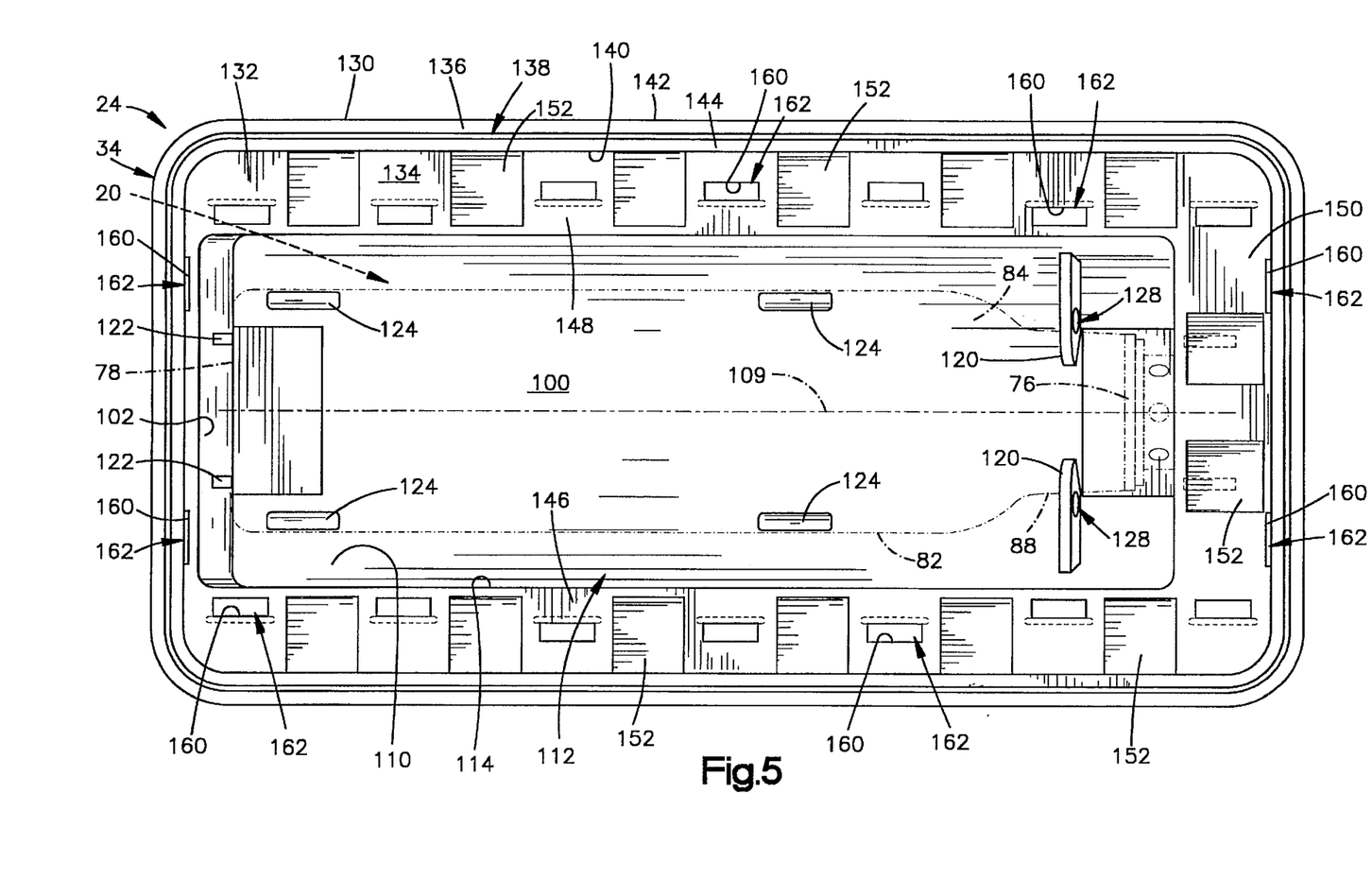
FIG. 5 is a view taken on line 5—5 of FIG. 4.
Figure 6:
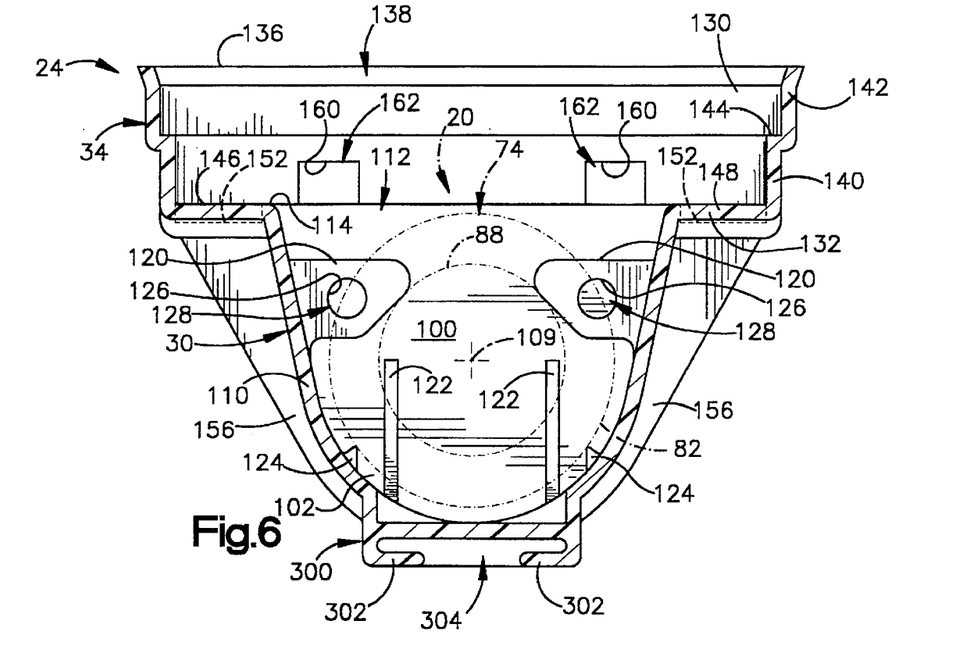
FIG. 6 is a view taken on line 6—6 of FIG. 4.

When the inflator 20 is in its installed position in the inner compartment 100, as shown in dot-dash lines in FIGS. 4–6, the neck tabs 120 engage the neck portion 84 of the container 74 at the cylindrical section 88 of the neck portion 84. The end wall tabs 122 engage the end wall 78 of the container 74. The body wall tabs 124 engage the body wall 80 of the container 74 at the major portion 82 of the body wall 80. The inflator 20 is substantially centered on the axis 109, with the actuator assembly 76 extending a short distance outward through the opening 108 in the second end wall 104. Importantly, the tabs 120, 122, and 124 space the container 74 from the major wall 110 of the reaction canister 24 so that the inflation fluid emitted from the manifold 96 can flow through the inner compartment 100 along the length and around the circumference of the container 74. In accordance with this feature of the present invention, each neck tab 120 preferably has an annular inner edge surface 126 (FIG. 6) defining a circular fluid flow passage 128 extending through the neck tab 120. Any suitable sealing structure, such as a gasket or the like (not shown), can be used to close and seal the opening 108 to block the inflation fluid from leaking outward through the opening 108 between the actuator assembly 76 and the edge surface 106.

The outer portion 34 of the reaction canister 24 has a rim wall 130 and a base wall 132. The rim wall 130 and the base wall 132 together define an outer compartment 134 for containing the retainer assembly 26. The outer compartment 134 has a substantially rectangular peripheral shape (FIG. 5) defined by the rim wall 130. An outer edge surface 136 of the rim wall 130 defines an opening 138 through which the retainer assembly 26 is movable into the outer compartment 134, as described fully below.

As best shown in FIG. 4, the rim wall 130 has inner and outer sections 140 and 142. The inner section 140 of the rim wall 130 extends outward from the base wall 132 to the outer section 142, and defines a shoulder surface 144 extending fully around the outer compartment 134. The outer section 142 of the rim wall 130 is slightly offset from the inner section 140 by the shoulder surface 144, and includes the outer edge surface 136 which defines the opening 138.

The base wall 132 defines the bottom of the outer compartment 134, and extends along three sides of the rectangular outlet opening 112 at the inner compartment 100. A pair of long sections 146 and 148 of the base wall 132 extend along the length of the outlet opening 112 on opposite sides of the outlet opening 112. A short section 150 of the base wall 132 extends across the width of the outlet opening 112 at one end of the outlet opening 112. Each of the three sections 146, 148, and 150 of the base wall 130 has a plurality of recessed surface portions 152 which are spaced apart along its length. Moreover, the base wall 132 and the rim wall 130 both project from the second end wall 104 of the reaction canister 24 in a direction extending along the axis 109. The outer portion 34 of the reaction canister 24 thus projects longitudinally beyond the inner portion 30 at the end of the inner portion 30 where the actuator assembly 76 is located. A plurality of external gussets 156 extend between the inner and outer portions 30 and 34 of the reaction canister 24.

Figure 7:
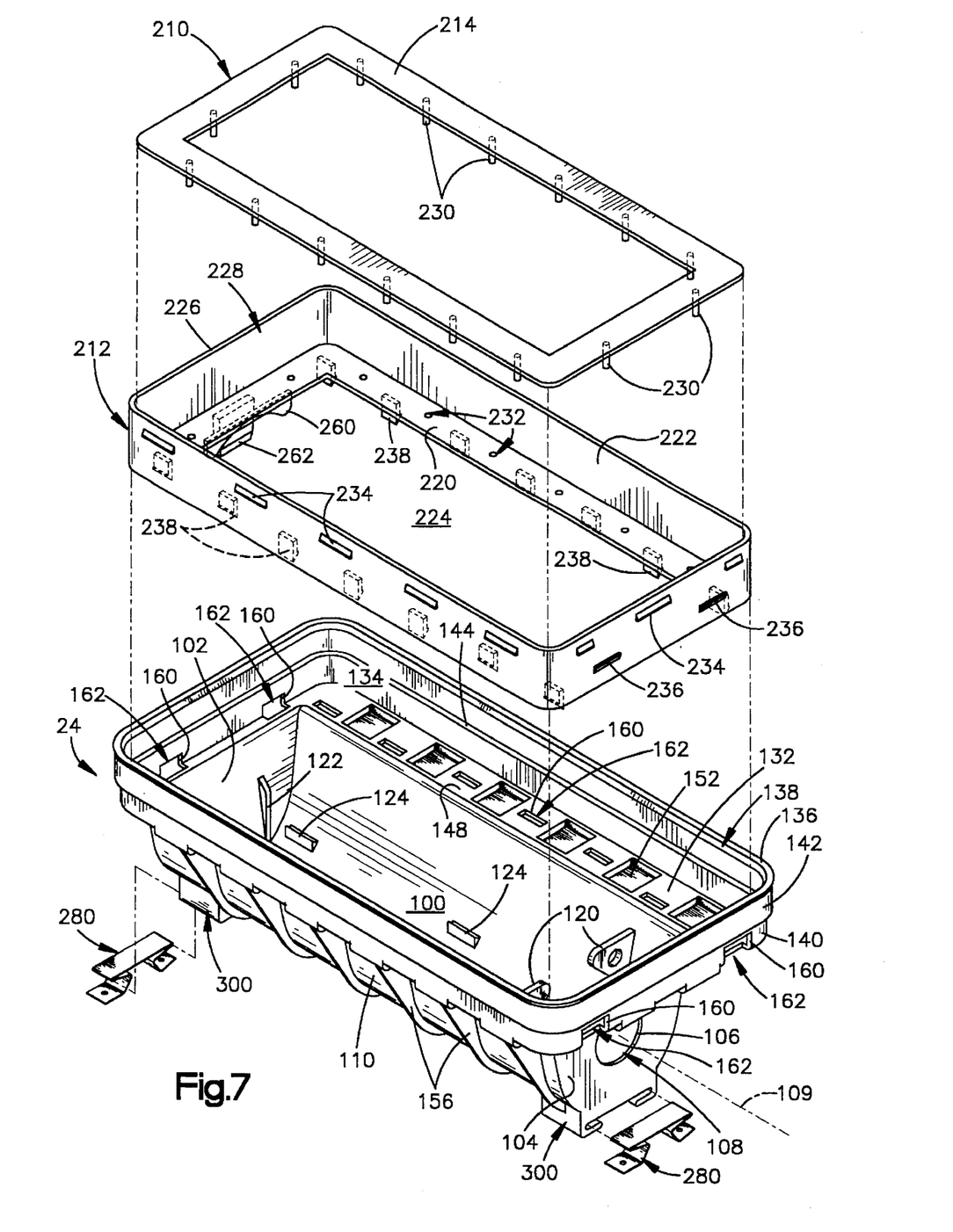
FIG. 7 is an exploded isometric view of parts of the apparatus of FIG. 1.

The outer portion 34 of the reaction canister 24 further has a plurality of edge surfaces 160. Each edge surface 160 defines a corresponding aperture 162. The apertures 162 are located near the bottom of the outer compartment 134, and are arranged in an array which extends fully around the periphery of the outer compartment 134. As best shown in FIG. 7, a pair of the apertures 162 is located at one end of the outer compartment 134. Another pair of the apertures 162 is located at the opposite end of the outer compartment 134. As best shown in FIG. 5, a staggered row of the apertures 162 extends along the first long section 146 of the base wall 132. Another staggered row of the apertures 162 extends along the second long section 148 of the base wall 132. This arrangement of the apertures 162 is preferred, but the number and/or the locations of the apertures 162 could differ.

In the schematic views of FIGS. 1 and 2, the air bag 18 is shown to have a body portion 190 and an inlet portion 192. When the air bag 18 is inflated from the condition of FIG. 1 to the condition of FIG. 2, the body portion 190 of the air bag 18 moves outward from the reaction canister 24 past the deployment door 44 and into the vehicle occupant compartment 14. The inlet portion 192 of the air bag 18 is retained in the reaction canister 24 by the retainer assembly 26.

Figure 8:
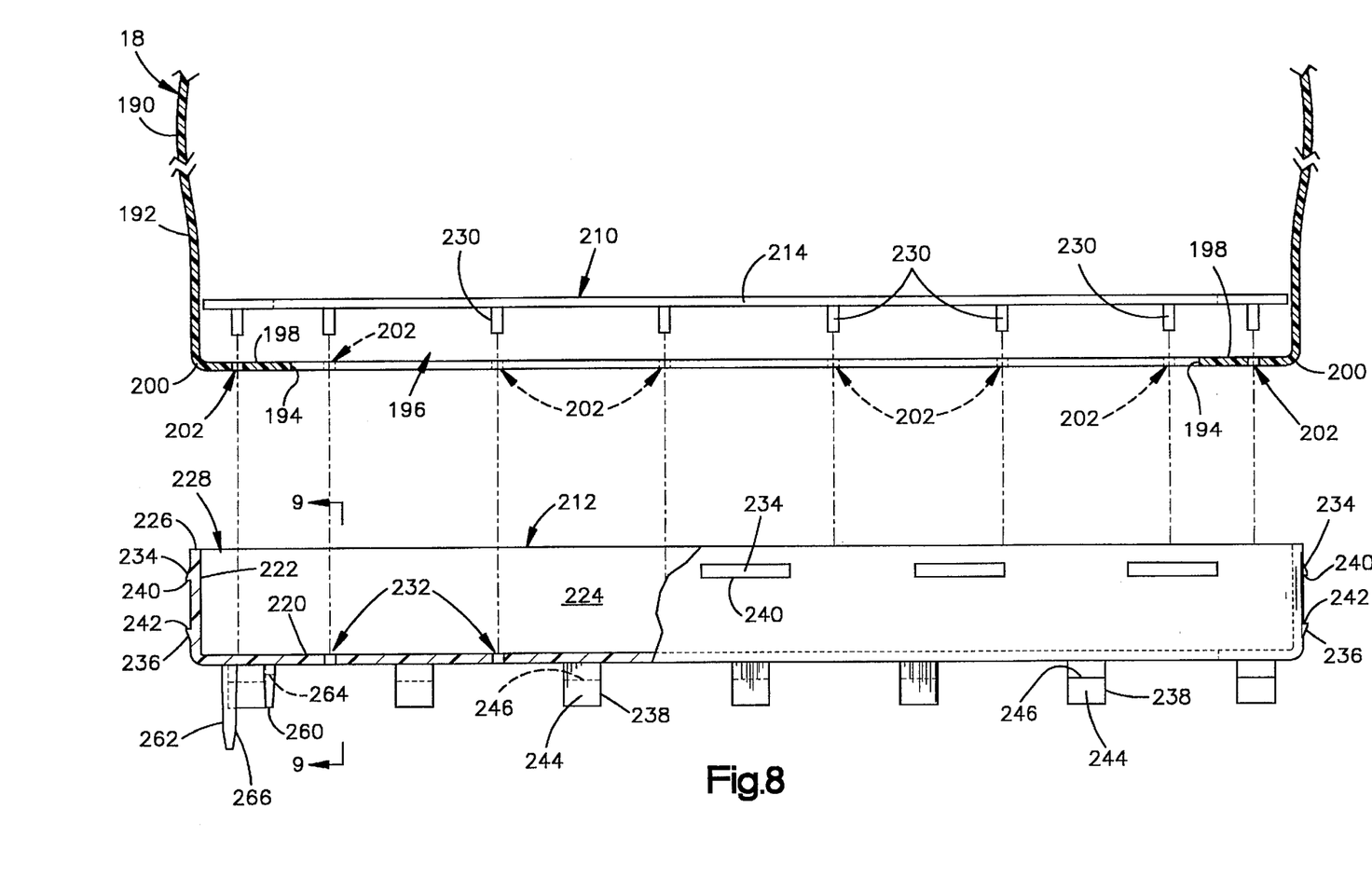
FIG. 8 is an enlarged, exploded side view of parts of the apparatus of FIG. 1.

As shown in greater detail in FIG. 8, the inlet portion 192 of the air bag 18 has an edge surface 194 defining an inlet opening 196. The inlet opening 196 has a generally rectangular shape, and is approximately the same size as the outlet opening 112 (FIG. 4) in the reaction canister 24. An edge section 198 of the inlet portion 192 extends between a surrounding corner 200 and the edge surface 194. A plurality of circular apertures 202 extend through the edge section 198. The apertures 202 are arranged in an array extending entirely around the inlet opening 196. As known in the art, the corner 200 may be defined by folds and/or seams in the fabric material of which the air bag 18 is formed, and the fabric material may be reinforced at the peripheries of the apertures 202 by stitches.

The retainer assembly 26 includes first and second retainer members 210 and 212 (FIGS. 7 and 8). Each of the retainer members 210 and 212 is preferably formed as a unitary plastic part, and is most preferably formed of the same plastic material of which the reaction canister 24 is formed. The first retainer member 210 comprises a narrow, flat strip 214 which is shaped as a rectangular band. The second retainer member 212 is shaped as a rectangular frame with a base wall 220 and a rim wall 222. The base wall 220 and the rim wall 222 together define a compartment 224 for containing the first retainer member 210 and the air bag 18. The base wall 220 of the second retainer member 212 has a rectangular size and shape like the size and shape of the strip 214, but has a perimeter which is slightly greater than the perimeter of the strip 214. The rim wall 222 projects outward from the periphery of the base wall 220, and has an outer edge surface 226 defining an opening 228 into the compartment 224. Accordingly, the opening 228 and the compartment 224 in the second retainer member 212 have rectangular peripheral shapes with lengths and widths that are slightly greater than the length and width of the first retainer member 210.

A plurality of cylindrical studs 230 on the first retainer member 210 project from one side of the strip 214. The number and locations of the studs 230 correspond with the number and locations of the apertures 202 (FIG. 8) in the air bag 18. A corresponding plurality of circular apertures 232 extend through the base wall 220 of the second retainer member 212.

The second retainer member 212 further has a plurality of locking tabs, including upper locking tabs 234, intermediate locking tabs 236, and lower locking tabs 238. The upper locking tabs 234 are arranged in an array extending fully around the outside of the rim wall 222, and are shaped as wedges with horizontal locking surfaces 240 facing downward, as viewed in FIG. 8. The intermediate locking tabs 236 also are shaped as wedges, and are arranged in pairs at opposite ends of the second retainer member 212. However, the intermediate locking tabs 236 are oriented oppositely to the upper locking tabs 234, and thus have upwardly facing locking surfaces 242. The lower locking tabs 238 project downward from the base wall 220, and are arranged in staggered rows. The staggered rows of lower locking tabs 238 correspond with the staggered rows of apertures 162 (FIG. 5) in the reaction canister 24. Each lower locking tab 238 has a wedge-shaped lower end portion 244 with an upwardly facing locking surface 246.

Figure 9:
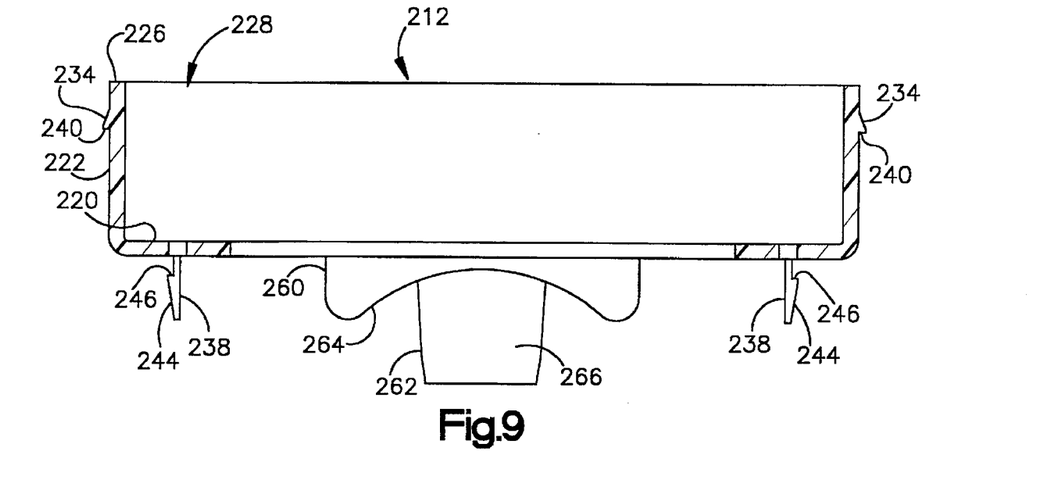
FIG. 9 is a view taken on line 9—9 of FIG. 8.

A pair of abutment structures 260 and 262 also project downward from the base wall 220 of the second retainer member 212. As shown in FIGS. 8 and 9, the first abutment structure 260 is spaced a short distance from one end of the second retainer member 212, and has an arcuate lower surface 264. The radius of curvature of the arcuate lower surface 264 is substantially equal to the radius of curvature of the outer surface of the body wall 80 (FIG. 3) of the container 74 at the major portion 82 of the body wall 80. The second abutment structure 262 is located between the first abutment structure 260 and the adjacent end of the second retainer member 212. A generally planar side surface 266 of the second abutment structure 262 faces toward the first abutment structure 260.

Figure 10A:
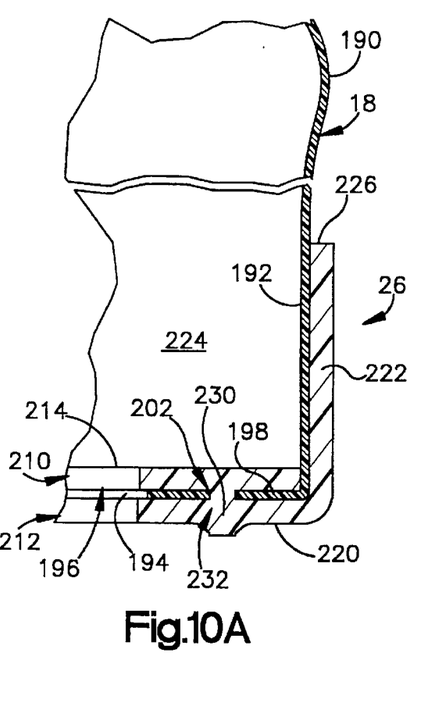
FIG. 10A is an enlarged partial view showing the parts of FIG. 8 in an assembled relationship.
Figure 10B:
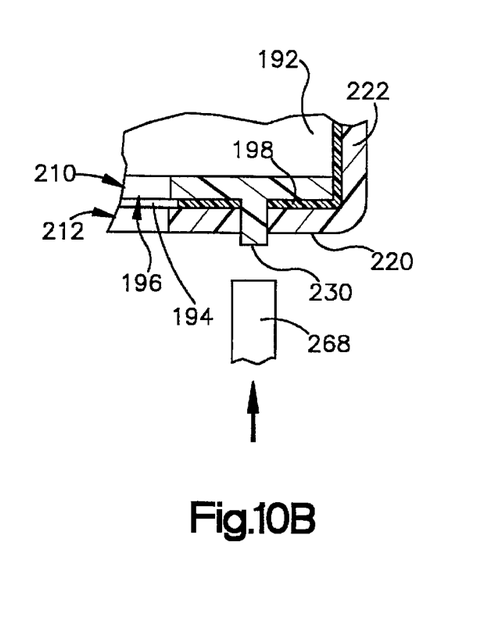
FIG. 10B is a view showing the parts of FIG. 10A in a partially assembled relationship.

When the air bag module 12 is being assembled, the first retainer member 210 is moved into the air bag 18 through the inlet opening 194. The studs 230 on the first retainer member 210 are then aligned with, and are received through, the apertures 202 in the inlet portion 192 of the air bag 18. The inlet portion 192 of the air bag 18 and the first retainer member 210 are then moved together into the compartment 224 in the second retainer member 212 through the opening 228. The studs 230, which then project outward from the apertures 202 in the air bag 18, are received through the apertures 232 in the base wall 220 of the second retainer member 212. As shown in FIG. 10A, the plastic material of the first retainer member 210 is fused to the plastic material of the second retainer member 212 where the studs 230 extend through the apertures 232. As shown schematically in FIG. 10B, the plastic materials are preferably fused together in a heat-staking process in which a heated die 268 is pressed against the protruding end of each stud 230. The edge section 198 of the air bag 18 is then held securely between the retainer members 210 and 212 by the studs 230.

When the air bag 18 and the retainer members 210 and 212 have been secured together as shown in FIG. 10A, the air bag 18 is folded into the compartment 224 in the second retainer member 212. The body portion 190 and the inlet portion 192 of the air bag 18 are thus received in the retainer assembly 26 in the folded, uninflated condition shown schematically in FIG. 1. Any suitable configuration of folds may be used for folding the air bag 18. In this manner, the retainer assembly 26 and the air bag 18 are assembled together as a part of the air bag module 12 which is separate from the reaction canister 24.

Figures 11, 12:
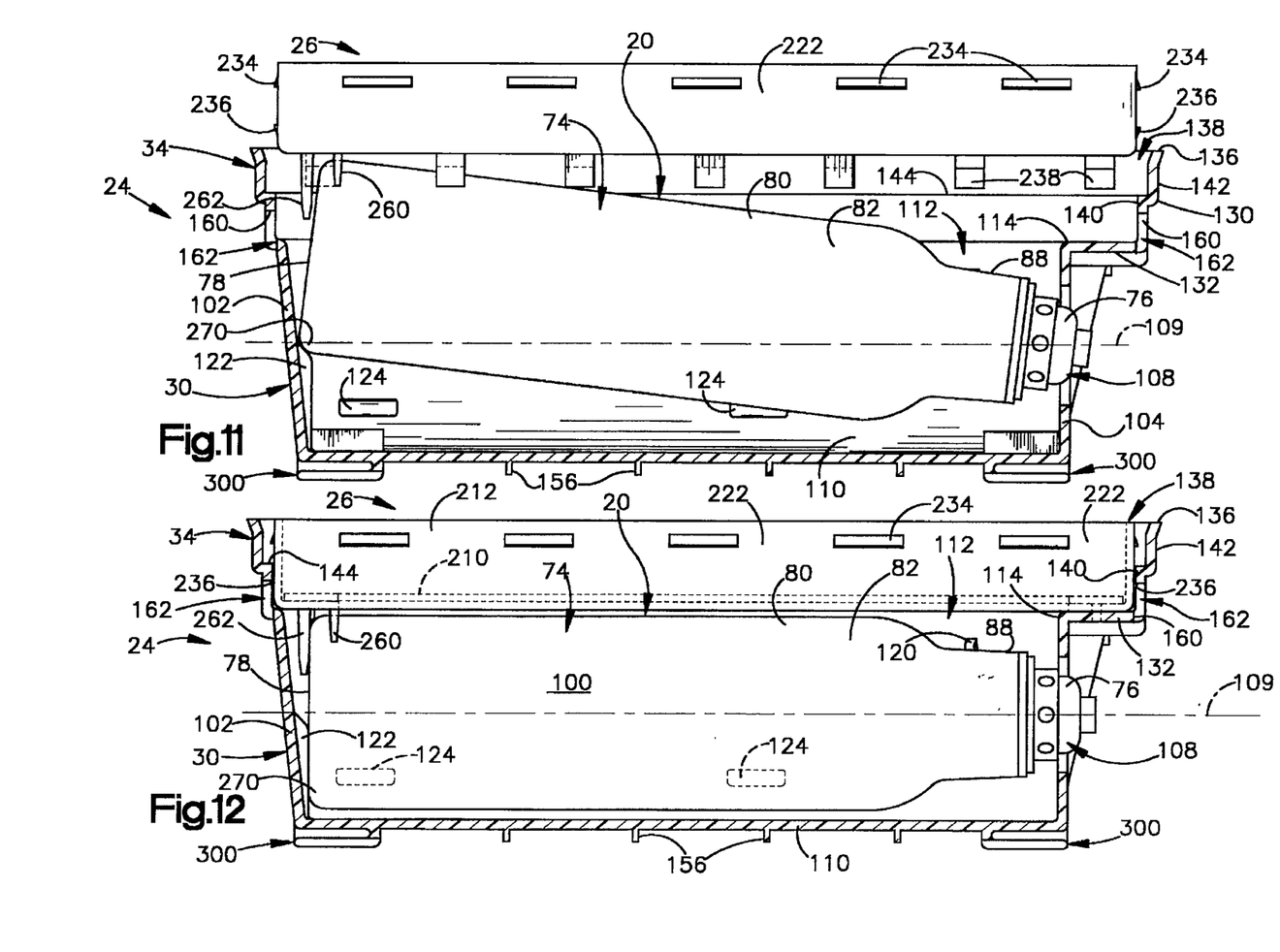
FIG. 11 is a view showing other parts of the apparatus of FIG. 1 in a partially assembled relationship.
FIG. 12 is a view showing the parts of FIG. 11 in an assembled relationship.

In a subsequent assembly step, the retainer assembly 26 is moved into the outer compartment 34 in the reaction canister 24. However, the inflator 20 is first placed loosely in the inner compartment 100 in the reaction canister 24, as shown in FIG. 11. The retainer assembly 26 is then pressed forcefully inward against the inflator 20 so as to snap the inflator 20 into its installed position in the inner compartment 100.

Specifically, the first abutment structure 260 on the retainer assembly 26 is pressed against the body wall 80 of the container 74 to push the inflator 20 transversely inward across the axis 109. The second abutment structure 262 is pressed against the end wall 78 of the container 74 to push the inflator 20 longitudinally inward along the axis 109. A lower corner portion 270 of the container 74 is thus pressed forcefully inward against the end wall tabs 122 at the first end wall 102 of the reaction canister 24. This causes the first end wall 102 to flex axially outward sufficiently to enable the end wall 78 of the container 74 to slide transversely inward along the end wall tabs 122 from the position of FIG. 11 toward the position of FIG. 12. The first end wall 102 of the reaction canister 24 then snaps back inward to exert an axial load against the end wall 74 of the container 72 through the end wall tabs 122. The neck portion 84 of the container 74 is simultaneously moved radially outward against the neck tabs 120, and is pressed against the neck tabs 120 firmly enough to resist being moved axially toward the second end wall 104. The container 74 is thus snapped into place between the tabs 120, 122, and 124 in the inner compartment 100 so as to be mechanically interlocked with the reaction canister 24.

Figure 13:
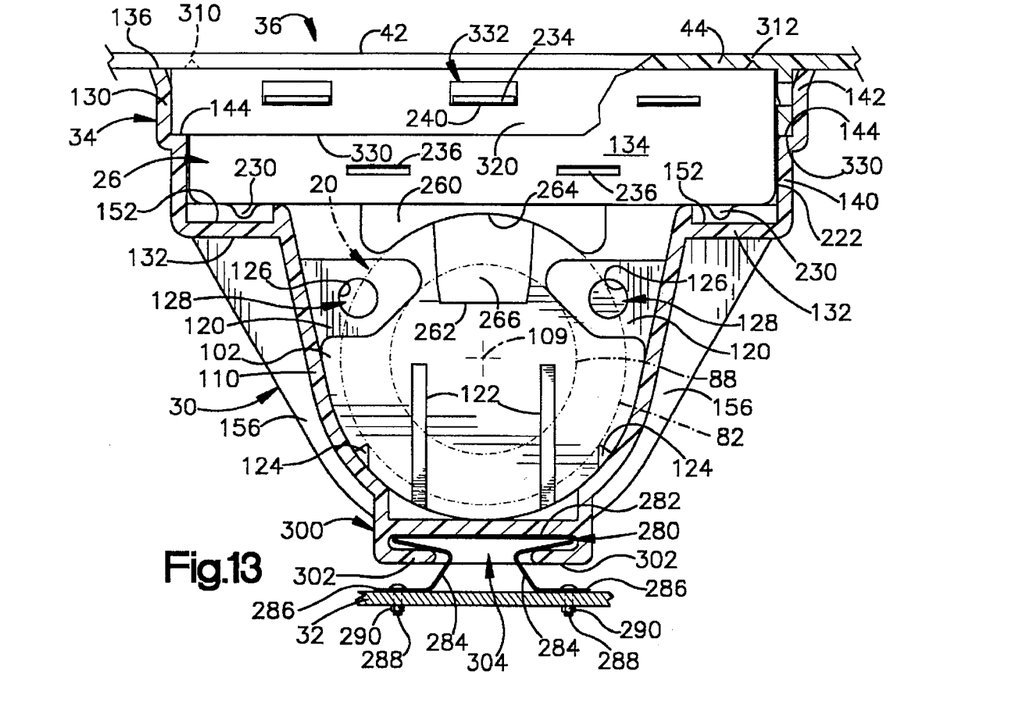
FIG. 13 is a view similar to FIG. 6 showing other parts of the apparatus of FIG. 1.

When the retainer assembly 26 is pressed forcefully inward against the inflator 20 in the foregoing manner, the lower locking tabs 238 on the retainer assembly 26 are moved inward through the corresponding apertures 162 in the base wall 132 of the reaction canister 24. The lower locking tabs 238 flex slightly when their wedge-shaped lower end portions 244 are moved inward through the apertures 162. When the lower end portions 244 pass fully through the apertures 162, the locking tabs 238 snap resiliently into positions in which the locking surfaces 246 engage the base wall 132 so as to block removal of the locking tabs 238 from the apertures 162. The intermediate locking tabs 236 are similarly moved into the corresponding apertures 162 (FIG. 7) at the opposite ends of the compartment 34. The locking surfaces 242 on the intermediate locking tabs 236 snap into locking engagement with rim wall 130 of the reaction canister 24. The retainer assembly 26 is thus snapped into an assembled relationship with the reaction canister 24. As shown in FIGS. 12 and 13, the rim wall 222 of the second retainer member 212 fits closely against the rim wall 130 of the reaction canister 24 at the inner section 140 of the rim wall 130. The base wall 132 of the reaction canister 24 is recessed sufficiently at the surface portions 152 to provide clearance for the studs 230, which project downward as shown in FIG. 13. The abutment structures 260 and 262 on the retainer assembly 26 remain in abutting engagement with the container 74 and help to hold the inflator 20 in its installed position in the reaction canister 24.

Since the retainer assembly 26 is assembled separately from the reaction canister 24, it may be snapped into the reaction canister 24 either before or after the reaction canister 24 is mounted in the vehicle. In either case, the reaction canister 24 in the preferred embodiment of the present invention is mounted in the vehicle on a pair of leaf springs 280, one of which is shown schematically in FIGS. 1 and 2.

The leaf springs 280 are alike. As shown in FIG. 13, each leaf spring 280 has a flat upper body portion 282 and a pair of legs 284 projecting downward from the body portion 282. The legs 284 are generally channel-shaped parts which are open in directions facing oppositely away from each other. Each leg 284 has an end portion 286 with an aperture for receiving a fastener, such as a bolt 288 with a nut 290. The leaf springs 280 are mounted on the supporting part 32 of the instrument panel 16 by the bolts 288 and the nuts 290.

The reaction canister 24 includes a pair of brackets 300 for engaging the leaf springs 280. The brackets 300 are located at the opposite ends of the inner portion 30 of the reaction canister 24. Each bracket 300 has a pair of oppositely facing bracket arms 302 (FIG. 6) which together define a slot 304. Each slot 304 is shaped to receive the upper portion 282 of a corresponding leaf spring 280, with the legs 284 of the leaf spring 280 extending outward from the slot 304 between the arms 302 of the bracket 300, as shown in FIG. 13.

When the air bag 18 restrains a vehicle occupant, the occupant moves forcefully against the air bag 18 in a direction toward the instrument panel 16. A force is then transmitted from the air bag 18 to the leaf springs 280 through the retainer assembly 26 and the reaction canister 24. The legs 284 of the leaf springs 280 are designed to flex in predetermined amounts under the influence of such a force. Some of the kinetic energy of the vehicle occupant is thus dissipated in a controlled manner when the vehicle occupant is being restrained by the air bag 18.

Figure 14:
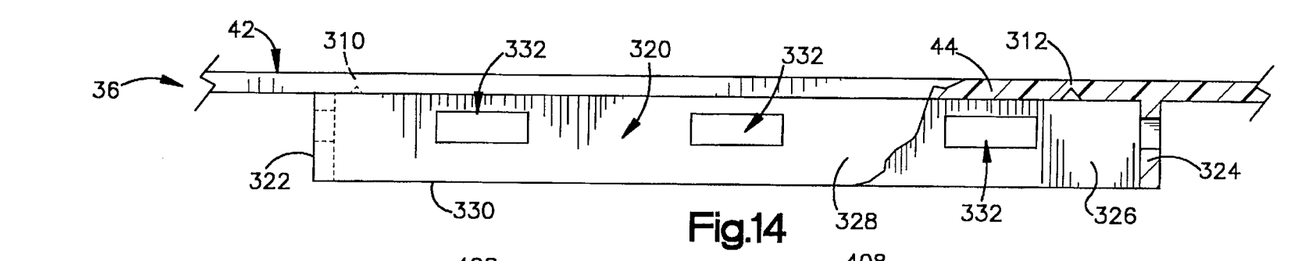
FIG. 14 is an enlarged view of a part shown in FIG. 13.

As described above with reference to FIGS. 1 and 2, the deployment panel 42 on the deployment assembly 36 extends fully across the opening 62 in the instrument panel 16. The deployment assembly 36 thus extends over the air bag 18, the retainer assembly 26, and the reaction canister 24. As shown in greater detail in FIGS. 13 and 14, the deployment panel 42 has a first thin section 310 and a second thin section 312. The first thin section 310 extends along one side of the deployment door 44, and defines a bendable hinge for the deployment door 44. The second thin section 312 extends around three sides of the deployment door 44 between the opposite ends of the first thin section 310. As known in the art, the second thin section 312 is ruptured by the fluid pressure force applied to the deployment panel 42 by the inflating air bag 18. When the second thin section 312 is ruptured, the deployment door 44 is released for pivotal movement about the hinge defined by the first thin section 310.

A base portion 320 of the deployment assembly 36 projects inward from the deployment panel 42. The base portion 320 has a rectangular peripheral shape defined by four base walls 322, 324, 326, and 328. The base walls 322–328 together surround the deployment door 44, and together define a lower edge surface 330 of the base portion 320. A plurality of slots 332 extend through the base portion 320. The number and locations of the slots 332 correspond with the number and locations of the upper locking tabs 234 (FIG. 8) on the second retainer member 212.

When the deployment assembly 36 is installed over the retainer assembly 26 and the reaction canister 24, as shown in FIG. 13, the base portion 320 of the deployment assembly 36 fits closely between the rim wall 222 on the retainer assembly 26 and the outer section 142 of the rim wall 130 on the reaction canister 24. The lower edge surface 330 of the base portion 320 abuts the shoulder surface 144 between the inner and outer sections 140 and 142 of the rim wall 130. The upper locking tabs 234 on the second retainer member 212 snap through the slots 332 in the base portion 320 of the deployment assembly 36 to lock the deployment assembly 36 in place.

Figures 15, 16:
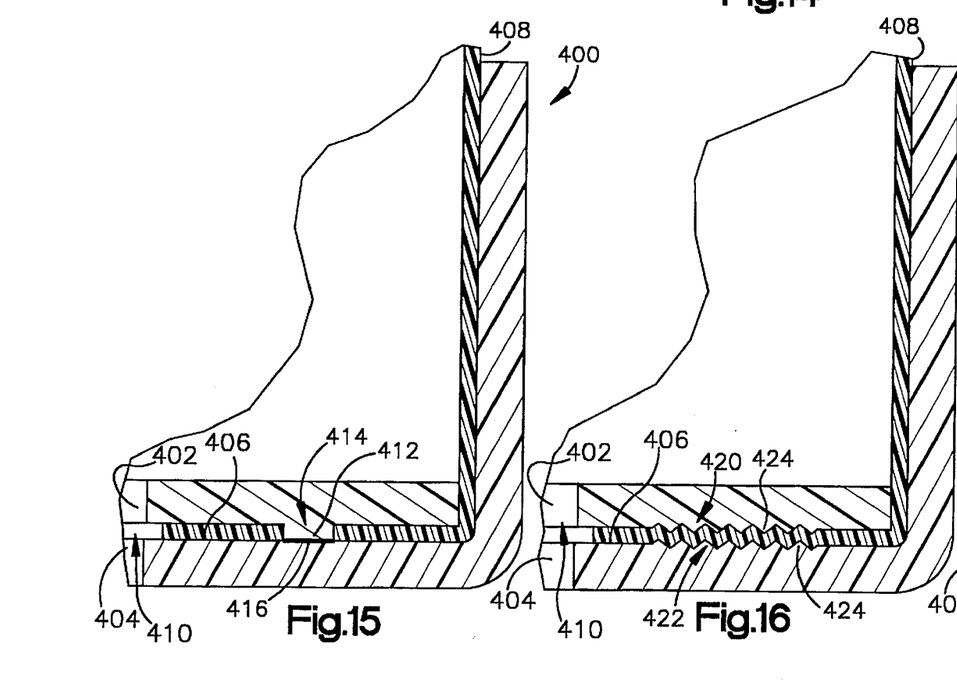
FIG. 15 is a view similar to FIG. 10 showing parts of a second embodiment of the present invention.
FIGS. 16 and 17 are views similar to FIG. 15 showing other parts of the second embodiment of the present invention.

Parts of a second embodiment of the present invention are shown partially in FIG. 15. In the second embodiment, the air bag module 12 (FIG. 1) includes an alternative retainer assembly 400 in place of the retainer assembly 26 described above. The alternative retainer assembly 400 includes first and second retainer members 402 and 404. The retainer members 402 and 404 together engage and retain an edge portion 406 of an air bag 408 around the periphery of an inlet opening 410 in the edge portion 406.

The foregoing parts of the second embodiment of the present invention are substantially similar to the corresponding parts of the first embodiment, as shown in FIG. 10A, but differ in the manner in which they are fastened to each other. The first retainer member 402 has a plurality of studs 412 which, like the studs 230 described above, project through corresponding apertures 414 in the corresponding air bag 408. However, the studs 412 do not project further through apertures in the second retainer member 404. Instead, the studs 412 extend longitudinally into abutment with the second retainer member 404. The plastic material of the first retainer member 402 is fused to the plastic material of the second retainer member 404, such as by an ultrasonic weld 416, where the studs 412 abut the second retainer member 404.

The second embodiment of the present invention further includes clamping structures which are arranged in pairs at locations that are spaced from each other around the perimeter of the retainer assembly 400. One such pair of clamping structures 420 and 422 is shown in FIG. 16. Each of the clamping structures 420 and 422 comprises a row of clamping teeth 424. The clamping teeth 424 in the first row 420 are opposed to, and are offset slightly from, the clamping teeth 424 in the second row 422 so that the two rows 420 and 422 of clamping teeth 424 are disposed in substantially meshing engagement. The edge portion 406 of the air bag 408 is clamped between the opposed rows 420 and 422 of clamping teeth 424.

Figure 17:
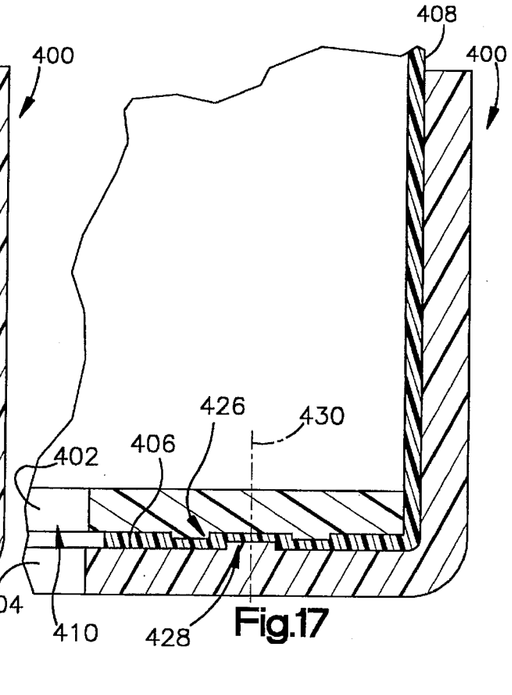

Another pair of clamping structures 426 and 428 is shown in FIG. 17. The clamping structure 426 on the first retainer member 402 is a tubular boss with a central axis 430. The clamping structure 428 on the second retainer member 404 is a cylindrical boss which is opposed to, and which extends axially inward of, the tubular boss 426. The edge portion 406 of the air bag 408 is clamped between the opposed bosses 426 and 428. The number and locations of the clamping structures of FIG. 16 and/or the clamping structures of FIG. 17 can vary as needed for clamping of the edge portion 406 of the air bag 408 between the retainer members 402 and 404. Such clamping structures may also be used in the first embodiment of the present invention described above.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for restraining a vehicle occupant, said apparatus comprising:

a canister having an outlet opening;

an inflator having an installed position in said canister;

an inflatable vehicle occupant restraint having an edge portion defining an inlet opening;

a retainer assembly comprising means for containing said restraint in an uninflated condition, said retainer assembly including a pair of retainers;

first fastener means for fastening said retainers to each other with said edge portion of said restraint being retained between said retainers; and second fastener means for fastening said retainer assembly and said canister to each other in an assembled relationship in which said inlet opening is aligned with said outlet opening;

said second fastener means snapping into a locked condition to establish a mechanical interlock between said retainer assembly and said canister upon movement of said retainer assembly and said canister into said assembled relationship.

2. Apparatus as defined in claim 1 wherein said second fastener means includes a plurality of flexible locking tabs which are received through a corresponding plurality of apertures upon said movement of said retainer assembly and said canister into said assembled relationship.

3. Apparatus as defined in claim 2 wherein said locking tabs are portions of said retainer assembly, said apertures being located on said canister.

4. Apparatus as defined in claim 1 wherein said canister comprises third fastener means for snapping into a locked condition to establish a mechanical interlock between said inflator and said canister upon movement of said inflator to said installed position in said canister.

5. Apparatus as defined in claim 4 wherein said retainer assembly and said canister together comprise means for moving said inflator to said installed position upon movement of said retainer assembly and said canister into said assembled relationship.

6. Apparatus for restraining a vehicle occupant, said apparatus comprising:

a canister having an outlet opening;

an inflator having an installed position in said canister;

an inflatable vehicle occupant restraint having an edge portion defining an inlet opening;

a retainer assembly comprising means for containing said restraint in an uninflated condition, said retainer assembly including a pair of retainers;

first fastener means for fastening said retainers to each other with said edge portion of said restraint being retained between said retainers; and second fastener means for fastening said retainer assembly and said canister to each other in an assembled relationship in which said inlet opening is aligned with said outlet opening;

said canister comprising third fastener means for snapping into a locked condition to establish a mechanical interlock between said inflator and said canister upon movement of said inflator to said installed position in said canister.

7. Apparatus as defined in claim 6 wherein said retainer assembly and said canister together comprise means for moving said inflator to said installed position upon movement of said retainer assembly and said canister into said assembled relationship.

8. Apparatus as defined in claim 7 wherein said inflator has a elongated structure with a longitudinally extending body wall and a transversely extending end wall, said means for moving said inflator comprising an abutment portion of said retainer assembly which engages said body wall of said inflator so as to push said inflator transversely toward said installed position.

9. Apparatus as defined in claim 8 wherein said body wall of said inflator has an outer surface with a first radius of curvature, said abutment portion of said retainer assembly having an abutment surface with a second radius of curvature equal to said first radius of curvature.

10. Apparatus as defined in claim 8 wherein said means for moving said inflator further comprises an additional abutment portion of said retainer assembly which engages said end wall of said inflator so as to push said inflator longitudinally toward said installed position.

11. Apparatus as defined in claim 6 wherein said inflator has a cylindrical body wall, said third fastener means supporting said body wall at a location spaced radially from an adjacent wall of said canister so as to provide clearance for said inflation fluid to flow circumferentially entirely around said body wall when said inflator is in said installed position.

12. Apparatus as defined in claim 11 wherein said body wall of said inflator has a tapered neck portion, said third fastener means comprising tabs on said canister, said tabs including a neck tab for engaging said neck portion of said inflator to block removal of said inflator from said installed position.

13. Apparatus as defined in claim 12 wherein said neck tab has an inner edge surface defining a fluid flow passage extending through said neck tab.

14. Apparatus for use with an inflatable vehicle occupant restraint, said apparatus comprising:

a canister having a pair of opposed canister walls;

inflator means for emitting inflation fluid for inflating the restraint, said inflator means comprising an elongated inflator structure having an installed position extending longitudinally between said opposed canister walls; and holder means for holding said inflator structure in said installed position, said holder means comprising an abutment member having an engaged position abutting an end wall of said inflator structure between said end wall and one of said opposed canister walls.

15. Apparatus as defined in claim 14 wherein said abutment member is a portion of a retainer assembly comprising means for retaining a portion of the restraint in said canister when the restraint is being inflated.

16. Apparatus as defined in claim 15 wherein said canister has an outlet opening for directing said inflation fluid from said inflator means to said retainer assembly, said abutment member projecting inward through said outlet opening from said retainer assembly to said inflator structure.

17. Apparatus as defined in claim 16 wherein said retainer assembly comprises a retainer ring and a retainer frame which surrounds and contains said retainer ring, said abutment member projecting from said retainer frame.

18. Apparatus as defined in claim 17 wherein said retainer frame and said abutment member are portions of a unitary plastic part.

19. Apparatus as defined in claim 14 wherein said inflator structure has an initial position in said canister, said abutment structure engaging said end wall of said inflator structure so as to push said inflator structure longitudinally from said initial position to said installed position upon movement of said abutment structure to said engaged position.

20. Apparatus as defined in claim 19 further comprising fastener means for snapping into a locked condition to establish a mechanical interlock between said abutment structure and said canister upon movement of said abutment structure to said engaged position.

21. Apparatus for restraining an occupant of a vehicle, said apparatus comprising:

a canister having an outlet opening;

an inflator having an installed position in said canister;

an inflatable vehicle occupant restraint having an edge portion defining an inlet opening;

a retainer assembly comprising means for containing said restraint in an uninflated condition, said retainer assembly including a pair of retainers;

first fastener means for fastening said retainers to each other with said edge portion of said restraint being retained between said retainers;

second fastener means for fastening said retainer assembly and said canister to each other in an assembled relationship in which said inlet opening is aligned with said outlet opening; and mounting means for mounting said canister on the vehicle, said mounting means being flexible so as yield in a predetermined amount under a force transmitted from said restraint to said canister upon movement of the vehicle occupant forcefully against said restraint.

22. Apparatus as defined in claim 21 wherein said mounting means comprises a leaf spring which bends under said force.

23. Apparatus as defined in claim 21 wherein said second fastener means snaps into a locked condition to establish a mechanical interlock between said retainer assembly and said canister upon movement of said retainer assembly and said canister into said assembled relationship.

24. Apparatus as defined in claim 21 wherein said canister comprises third fastener means for snapping into a locked condition to establish a mechanical interlock between said inflator and said canister upon movement of said inflator to said installed position in said canister.

25. Apparatus as defined in claim 24 wherein said retainer assembly and said canister together comprise means for moving said inflator to said installed position upon movement of said retainer assembly and said canister into said assembled relationship.

26. Apparatus for restraining a vehicle occupant, said apparatus comprising:

a canister having an outlet opening;

an inflator having an installed position in said canister;

an inflatable vehicle occupant restraint having an edge portion defining an inlet opening;

a retainer assembly comprising means for containing said restraint in an uninflated condition, said retainer assembly including a pair of retainers;

first fastener means for fastening said retainers to each other with said edge portion of said restraint being retained between said retainers; and second fastener means for fastening said retainer assembly and said canister to each other in an assembled relation in which said inlet opening is aligned with said outlet opening;

said first fastener means comprising portions of said retainers which are in a condition of being fused together.

27. Apparatus as defined in claim 26 wherein said portions of said retainers comprise studs on one of said retainers which project through apertures in the other of said retainers, said condition comprising a heat-staked condition.

28. Apparatus as defined in claim 26 wherein said portions of said retainers comprise studs on one of said retainers which extend longitudinally into abutment with the other of said retainers, said condition comprising an ultrasonically welded condition.

29. Apparatus as defined in claim 26 wherein said retainers together have opposed clamping means for clamping said edge portion of said restraint between said retainers.

30. Apparatus as defined in claim 29 wherein said opposed clamping means comprises opposed teeth.

31. Apparatus as defined in claim 29 wherein said opposed clamping means comprises a cylindrical boss and a tubular boss opposed to said cylindrical boss.

32. Apparatus as defined in claim 26 wherein said second fastener means snaps into a locked condition to establish a mechanical interlock between said retainer assembly and said canister upon movement of said retainer assembly and said canister into said assembled relationship.

33. Apparatus as defined in claim 26 wherein said canister comprises third fastener means for snapping into a locked condition to establish a mechanical interlock between said inflator and said canister upon movement of said inflator to said installed position in said canister.

34. Apparatus as defined in claim 33 wherein said retainer assembly and said canister together comprise means for moving said inflator to said installed position upon movement of said retainer assembly and said canister into said assembled relationship.

35. Apparatus as defined in claim 26 further comprising mounting means for supporting said canister on the vehicle, said mounting means being flexible so as to yield in a predetermined amount under a force transmitted from said restraint to said canister upon movement of the vehicle occupant forcefully against said restraint.

* * * * *